(12) United States Patent
Song

(10) Patent No.: US 6,600,539 B2
(45) Date of Patent: Jul. 29, 2003

(54) VERTICALLY-ALIGNED LIQUID CRYSTAL DISPLAY WITH A SMALL DOMAIN

(75) Inventor: Jang-Kun Song, Seoul (KR)

(73) Assignee: Samsung Electronics Co., Ltd., Suwon (KR)

( * ) Notice: Subject to any disclaimer, the term of this patent is extended or adjusted under 35 U.S.C. 154(b) by 196 days.

(21) Appl. No.: 09/879,112

(22) Filed: Jun. 13, 2001

(65) Prior Publication Data

US 2001/0050746 A1 Dec. 13, 2001

(30) Foreign Application Priority Data

Jun. 13, 2000 (KR) ........................................ 2000-32507

(51) Int. Cl.[7] .............................................. G02F 1/1337
(52) U.S. Cl. ...................... 349/130; 349/143; 349/122; 349/178; 349/128; 349/129; 349/134; 349/139
(58) Field of Search ................................ 349/130, 143, 349/122, 178, 106, 128, 129, 156, 160, 134, 139

(56) References Cited

U.S. PATENT DOCUMENTS

| | | | | |
|---|---|---|---|---|
| 5,249,070 A | * | 9/1993 | Takano | 359/54 |
| 5,576,863 A | * | 11/1996 | Aoki et al. | 359/76 |
| 5,801,802 A | * | 9/1998 | Inoue et al. | 349/129 |
| 5,940,056 A | * | 8/1999 | Hanazawa et al. | 345/87 |
| 5,946,067 A | * | 8/1999 | Kim et al. | 349/141 |
| 5,959,707 A | * | 9/1999 | Murai et al. | 349/129 |
| 6,226,061 B1 | * | 5/2001 | Tagusa | 349/84 |
| 6,335,776 B1 | * | 1/2002 | Kim et al. | 349/129 |
| 6,424,398 B1 | * | 7/2002 | Taniguchi | 349/143 |
| 6,466,291 B1 | * | 10/2002 | Ham | 349/141 |

* cited by examiner

Primary Examiner—Nathan J. Flynn
Assistant Examiner—Fazuli Erdem
(74) Attorney, Agent, or Firm—McGuireWoods LLP; Hae-Chan Park (57) ABSTRACT

Disclosed is a liquid crystal display comprising first and second substrates provided opposing one another; a liquid crystal layer made of liquid crystal material that is injected between the first and second substrates; pixel electrodes and a common electrode formed on at least one of the substrates, the pixel electrodes and common electrode generating an electric field that acts on the liquid crystal layer; and domain formation means for controlling a slanting direction of liquid crystal molecules within the liquid crystal layer, wherein m is an integer satisfying the following:

$$h/2(\pi/wp)^{1/2} - 2 \leq m \leq h/2(\pi/wp)^{1/2} + 2$$

where m is a number of domains formed by dividing the pixel electrodes by the domain formation means, w is a length of a first direction of the pixel electrodes, h is a length of a second direction of the pixel electrodes, the second direction being perpendicular to the first direction, and p is a width of a second direction of the domain formation means.

18 Claims, 6 Drawing Sheets

FIG.8 domain division modeling

VERTICALLY-ALIGNED LIQUID CRYSTAL DISPLAY WITH A SMALL DOMAIN

BACKGROUND OF THE INVENTION (a) Field of the Invention

The present invention relates to a liquid crystal display, and more particularly, to a vertically-aligned liquid crystal display in which pixel regions are divided into small domains.

(b) Description of the Related Art

In a liquid crystal display (LCD), liquid crystal material is injected between an upper substrate, on which common electrodes and a color filter are formed, and a lower substrate, on which thin film transistors and pixel electrodes are formed. A voltage of a different potential is applied to the pixel electrodes and common electrodes to form an electric field, thereby varying the alignment of liquid crystal molecules of the liquid crystal material. In this way, the transmittance of incident light is controlled to enable the display of images.

However, a serious drawback of LCDs is the limited viewing angle. Various methods and configurations have been developed to overcome this problem. Among such methods, the liquid crystal molecules are aligned perpendicularly to the upper and lower substrates, and either a predetermined aperture pattern or protrusions are formed on the pixel electrodes and the opposing common electrodes.

By forming the aperture patterns on the pixel electrodes and common electrodes, a fringe field is generated. Using the fringe field, a slanting direction of the liquid crystal molecules is controlled to increase the viewing angle. When protrusions are formed on the pixel electrodes and common electrodes, on the other hand, an electric field distorted by the protrusions is used to control the slanting direction of the liquid crystal molecules. In an alternative method, aperture patterns are formed in the pixel electrodes provided on the lower substrate and protrusions are formed on the common electrodes provided on the upper substrate. Using a fringe field generated by the aperture pattern and protrusions, the slanting direction of the liquid crystal molecules is controlled to form domains.

However, in the above methods, dark portions where light is not transmitted appear in areas where the aperture patterns and protrusions are formed. As a result, a large area occupied by the aperture patterns and protrusions may reduce the brightness of the LCD panel. If the number of aperture patterns and protrusions is reduced in an attempt to remedy this problem, the ability to control the slanting of the liquid crystal molecules is reduced and results in an uneven alignment. Hence, the texture generated by the uneven alignment extends over relatively large areas and reduce the brightness and overall picture quality.

SUMMARY OF THE INVENTION

The present invention has been made in an effort to solve the above problems.

It is an object of the present invention to provide a liquid crystal display in which spacing between aperture patterns, protrusions and other such elements that control the formation of domains is controlled to optimize the size of domains and enhance the picture quality.

To achieve the above object, the present invention provides a liquid crystal display comprising first and second substrates provided opposing one another; a liquid crystal layer made of liquid crystal material injected between the first and second substrates; pixel electrodes and a common electrode formed on at least one of the substrates, the pixel electrodes and common electrode generating an electric field that acts on the liquid crystal layer; and domain formation means for controlling a slanting direction of liquid crystal molecules within the liquid crystal layer, wherein m is an integer satisfying the following:

$$h/2(\pi/wp)^{1/2}-2 \leq m \leq h/2(\pi/wp)^{1/2}+2$$

where m is a number of domains formed by dividing the pixel electrodes by the domain formation means, w is a length of a first direction of the pixel electrodes, h is a length of a second direction of the pixel electrodes, the second direction being perpendicular to the first direction, and p is a width of a second direction of the domain formation means.

In another aspect, the present invention provides a liquid crystal display comprising first and second substrates provided opposing one another; a liquid crystal layer made of liquid crystal material that is injected between the first and second substrates; pixel electrodes and a common electrode formed on at least one of the substrates, the pixel electrodes and common electrode generating an electric field that acts on the liquid crystal layer; and domain formation means for controlling a slanting direction of liquid crystal molecules within the liquid crystal layer, wherein the domain formation means includes first direction means and second direction means according to an alignment direction, and wherein the pixel electrodes are divided into a first region corresponding to a position of the first direction means and a second region corresponding to a position of the second direction means, and wherein m is an integer satisfying the following:

$$h/2(\pi/wp)^{1/2}-2 \leq m \leq h/2(\pi/wp)^{1/2}+2$$

where m is a number of domains formed by divisions into the first regions and second regions respectively by the first direction means and second direction means, w is a length of a first direction of the first regions and a length of a second direction of the second regions, h is a length of a second direction of the first regions and a first direction of the second regions, and p is a width of the second direction of the first direction means and a width of the first direction of the second direction means.

According to a feature of the present invention, the domain formation means is realized through first and second aperture patterns formed respectively in the common electrode and the pixel electrodes.

According to another feature of the present invention, the first aperture pattern and the second aperture pattern are formed alternately.

According to yet another feature of the present invention, the domain formation means is realized through first and second protrusions formed respectively on the first and second substrates.

According to still yet another feature of the present invention, the first protrusions and the second protrusions are arranged alternately.

According to still yet another feature of the present invention, the domain formation means is realized through an aperture pattern formed in the pixel electrodes and protrusions formed on the first substrate.

According to still yet another feature of the present invention, apertures of the aperture pattern and the protrusions are arranged alternately.

According to still yet another feature of the present invention, h=3w and p=w/10.

According to still yet another feature of the present invention, h=1.5w and p=w/10.

According to still yet another feature of the present invention, if a length of a direction vertical to liquid crystal directors of the domains divided by the domain formation means is denoted by α, and a length of a direction parallel to the liquid crystal directors of the domains is denoted by β, β/α≦⅓.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

Preferred embodiments of the present invention will now be described in detail with reference to the accompanying drawings.

Figure 1:
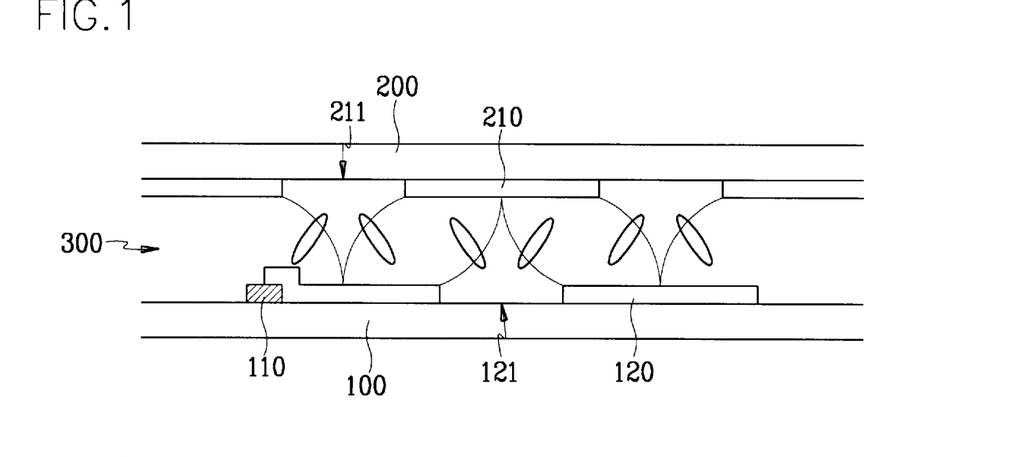
FIG. 1 is a partial sectional view of a liquid crystal display according to a first preferred embodiment of the present invention.

FIG. 1 shows a partial sectional view of a liquid crystal display according to a first preferred embodiment of the present invention. It is to be assumed that the structure shown in the drawing repeats over an entire area of the liquid crystal display.

The liquid crystal display includes a lower substrate 100 and an upper substrate 200, and a liquid crystal layer 300 formed between the substrates 100 and 200. Liquid crystal molecules of the liquid crystal layer 300 align in an upright direction with respect to the substrates 100 and 200. A thin film transistor 110 and a pixel electrode 120 are formed on the lower substrate 100, and a common electrode 210 is formed on the upper substrate 200. As a means to form domains, lower and upper aperture patterns 121 and 211 are formed in the pixel electrode 120 and the common electrode 210, respectively. The lower aperture pattern 121 is formed with apertures that do not overlap with apertures of the upper aperture pattern 211. In other words, the apertures alternate in location. In the liquid crystal display with the above structure, a fringe field formed by the aperture patterns 121 and 211 of the electrodes 120 and 210 uniformly controls a slanting direction of the liquid crystal molecules.

Figure 2:
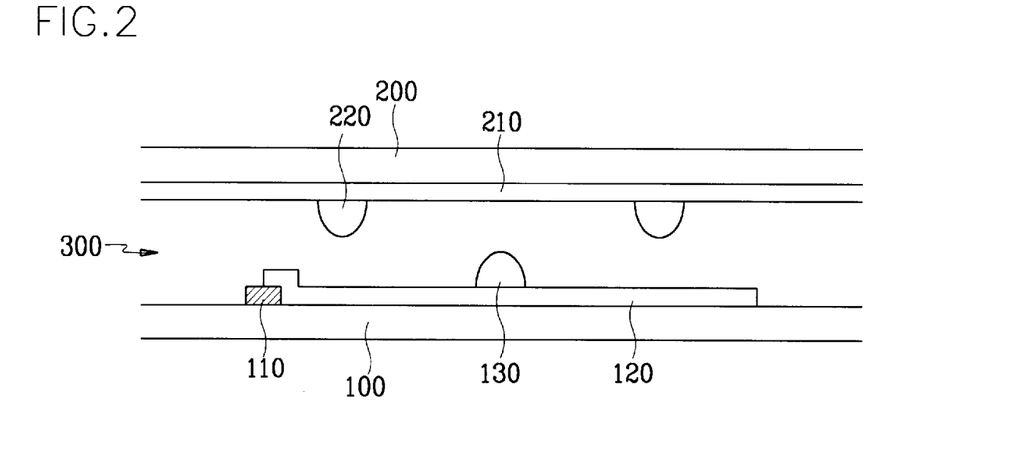
FIG. 2 is a partial sectional view of a liquid crystal display according to a second preferred embodiment of the present invention.

FIG. 2 shows a partial sectional view of a liquid crystal display according to a second preferred embodiment of the present invention. It is to be assumed that the structure shown in the drawing repeats over an entire area of the liquid crystal display.

The liquid crystal display includes a lower substrate 100 and an upper substrate 200, and a liquid crystal layer 300 formed between the substrates 100 and 200. A thin film transistor 110 and a pixel electrode 120 are formed on the lower substrate 100, and a common electrode 210 is formed on the upper substrate 200. As a means to form domains in the second embodiment, protrusions 130 and 220 are formed on the pixel electrode 120 and the common electrode 210, respectively. The protrusions 130 and 220 have a different anisotropy than the liquid crystal layer 300 such that a distorted electric field is generated at boundaries of these elements. This distortion is used as a fringe field to control the slanting direction of liquid crystal molecules of the liquid crystal layer 300.

Figure 3:
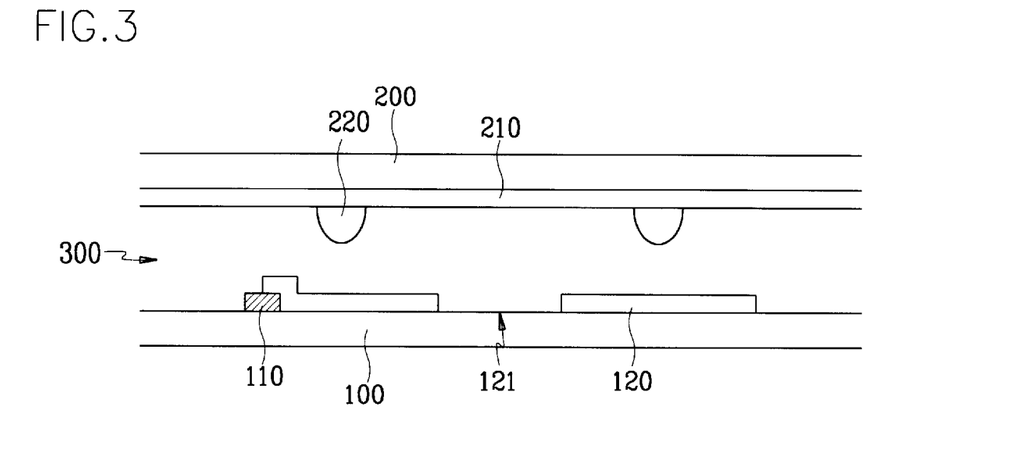
FIG. 3 is a partial sectional view of a liquid crystal display according to a third preferred embodiment of the present invention.

FIG. 3 shows a partial sectional view of a liquid crystal display according to a third preferred embodiment of the present invention. It is to be assumed that the structure shown in the drawing repeats over an entire area of the liquid crystal display.

The liquid crystal display includes a lower substrate and an upper substrate, and a liquid crystal layer 300 formed between the substrates 100 and 200. A thin film transistor 110 and a pixel electrode 120 are formed on the lower substrate 100, and a common electrode 210 is formed on the upper substrate 200. As a means to form domains in the third embodiment, both protrusions and aperture patterns are used in combination. That is, an aperture pattern 121 is formed in the pixel electrode 120 and protrusions 220 are formed in the common electrode 210. The protrusions 220 have a different anisotropy than the liquid crystal layer 300.

Figure 4:
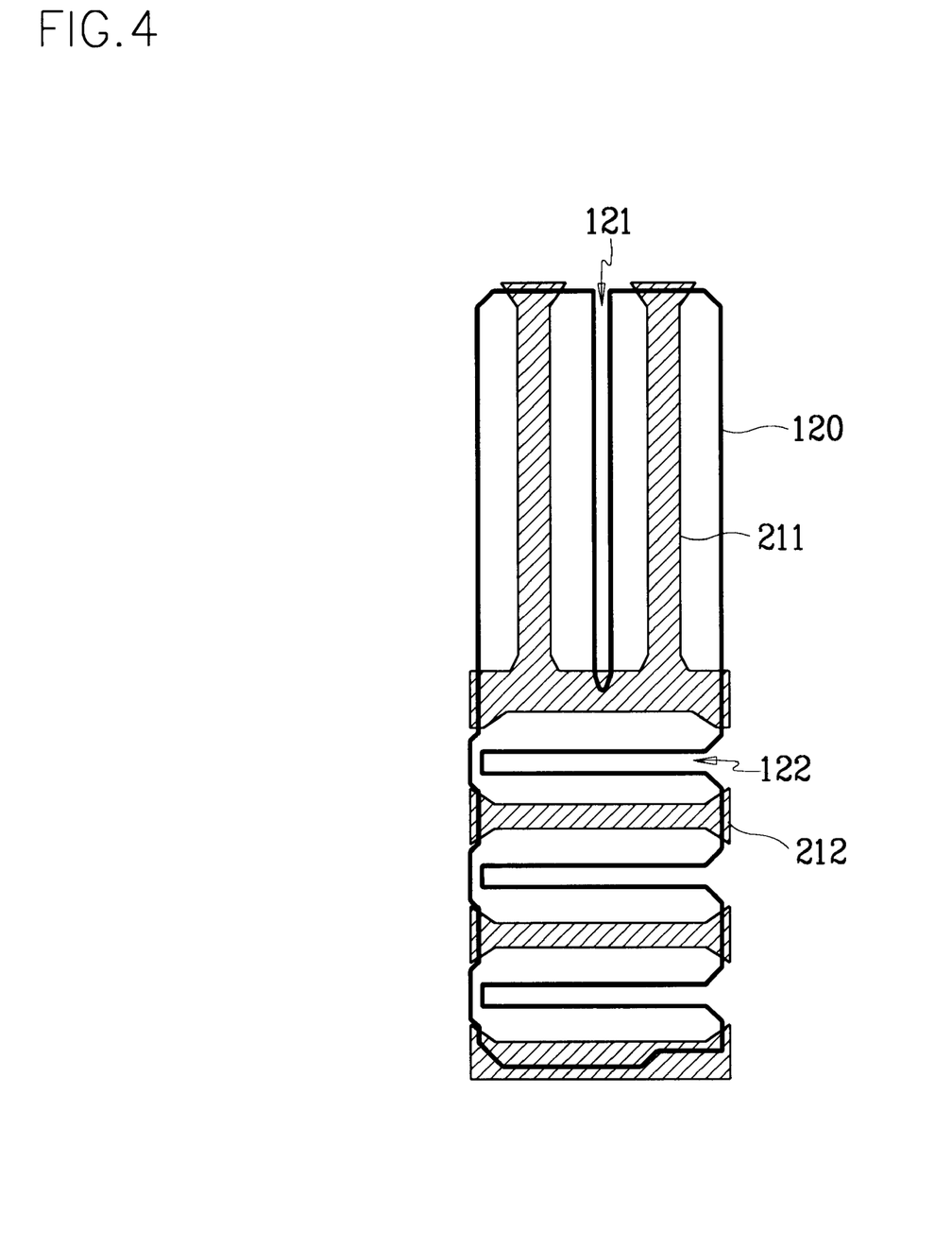
FIG. 4 is a schematic plane view of a single pixel region in a liquid crystal display according to a fourth preferred embodiment of the present invention.

In addition to the configurations described above, it is also possible to form protrusions and aperture patterns only on the lower substrate 100, or to form the pixel electrodes 120 or common electrode 210 over protrusions to realize an irregular surface, etc. The resulting planar configuration of such various structures for the means to form domains will now be described FIG. 4 shows a schematic plane view of a single pixel region in a liquid crystal display according to a fourth preferred embodiment of the present invention.

As shown in the drawing, if a pixel electrode 120 is divided roughly in half into an upper portion and a lower portion, an aperture 121 is formed vertically (in the drawing) in the upper portion and a plurality of apertures 122 are formed horizontally (in the drawing) in the lower portion. Apertures 211 and 212 are also formed in a common electrode. The apertures 211 are formed vertically in an area corresponding to the upper portion of the pixel electrode 120, and the apertures 212 are formed horizontally in an area corresponding to the lower portion of the pixel electrode 120. The apertures 211 and 212 of the common electrode do not overlap the apertures 121 and 122 of the pixel electrode 120. In other words, the apertures 211 and 212 are formed in an alternating manner with the apertures 121 and 122.

In the fourth embodiment, although the apertures 121, 122, 211 and 212 were provided as the domain formation means as in the first embodiment, it is also possible to provide protrusions as in the second embodiment or a mixture of protrusions and apertures as in the third embodiment.

Figure 5:
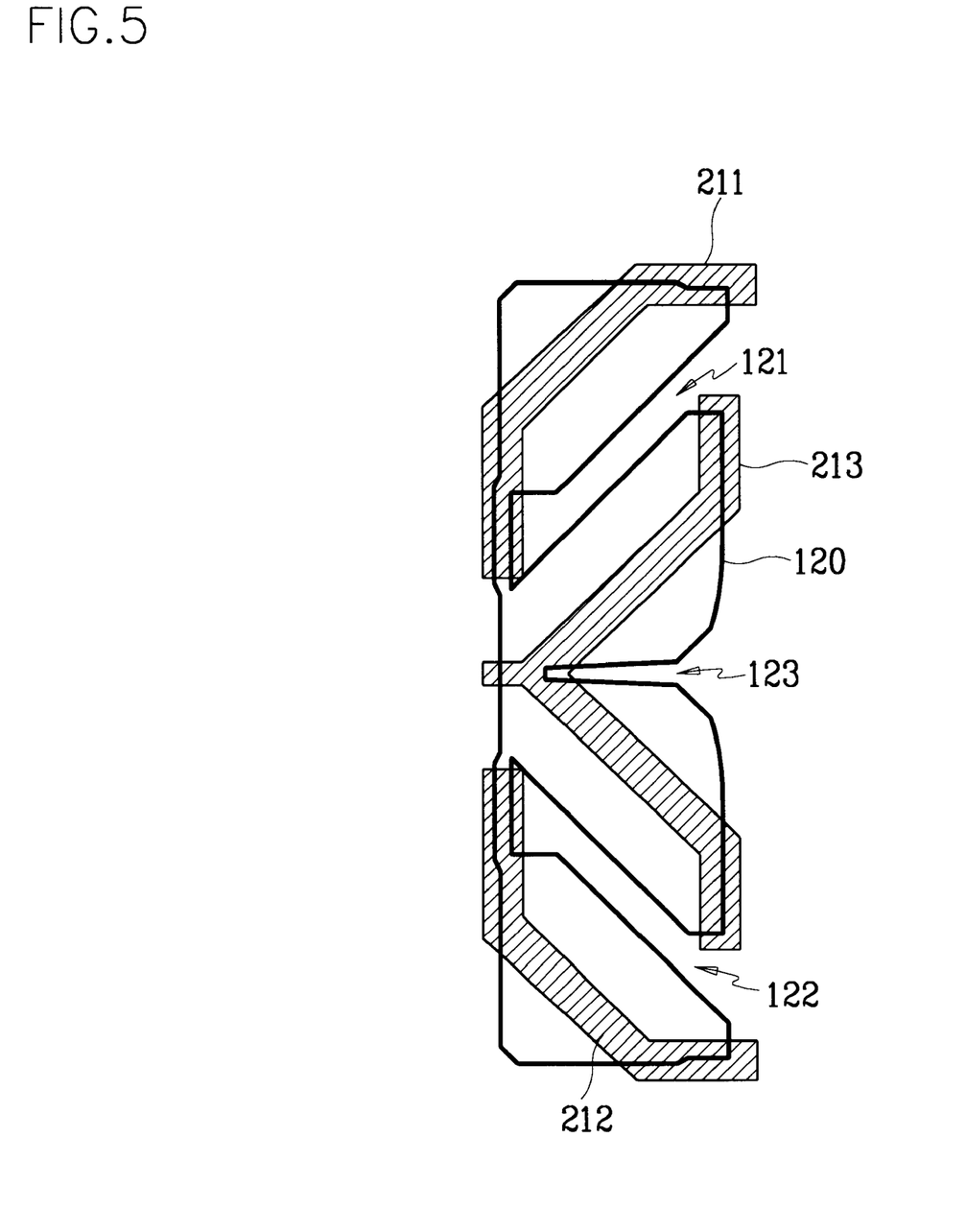
FIG. 5 is a schematic plane view of a single pixel region in a liquid crystal display according to a fifth preferred embodiment of the present invention.

FIG. 5 shows a schematic plane view of a single pixel region in a liquid crystal display according to a fifth preferred embodiment of the present invention.

As shown in FIG. 5, an aperture 123 is formed in the pixel electrode 120 at a center portion thereof to divide the pixel electrode 120 substantially in half, into an upper portion and a lower portion. The aperture 123 extends at this location from a right side of the pixel electrode 120 toward, but not reaching, a left side of the pixel electrode 120. Formed in the upper portion of the pixel electrode 120 is an aperture 121, which extends diagonally from an upper right side of the pixel electrode in a downward direction to the left side of the pixel electrode 120. An aperture 122 is formed diagonally in the lower portion of the pixel electrode 120, extending from a lower right side in a direction upward to the left side of the pixel electrode 120.

Apertures 211, 212 and 213 are also formed in the common electrode. The aperture 211 is formed in an area corresponding to the upper portion of the pixel electrode 120, and the aperture 212 is formed in an area corresponding to the lower portion of the pixel electrode 120. The aperture 211 extends to overlap with an upper side of the pixel electrode 120 and a left side of the pixel electrode 120, and a center portion of the aperture 211 extends diagonally to interconnect these two portions at an angle substantially identical to that of the aperture 121 of the pixel electrode 120. The aperture 212 is formed in a similar pattern in the area corresponding to the lower portion of the pixel electrode 120. The aperture 213 is formed between the apertures 211 and 212, and includes center portions formed diagonally on a side opposite diagonal portions of the apertures 211 and 212 with respect to the apertures 121 and 122 of the pixel electrode 120. The aperture 213 begins extending at areas corresponding to the right side of the pixel electrode 120 and ends at a point where the diagonal portions meet. As a result of this configuration, the apertures 121, 122, and 123 of the pixel electrode 120 are formed alternately with the apertures 211, 212 and 213 of the common electrode.

In the fourth embodiment, although the apertures 121, 122, 123, 211, 212 and 213 were provided as the domain formation means as in the first embodiment, it is also possible to provide protrusions as in the second embodiment or a mixture of protrusions and apertures as in the third embodiment.

In a vertically-aligned mode, if a variety of methods are used to divide a pixel into domains, the domains may have various shapes. However, the resulting shape of the domains is basically rectangular or oval-shaped. The domains will be described in more detail with reference to the drawings.

Figure 6A:
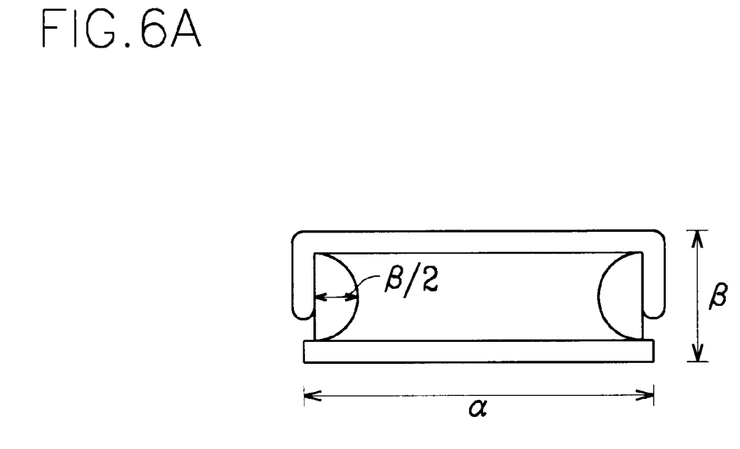
FIGS. 6A and 6B are drawings showing planar shapes of domains divided by domain formation means.
Figure 6B:
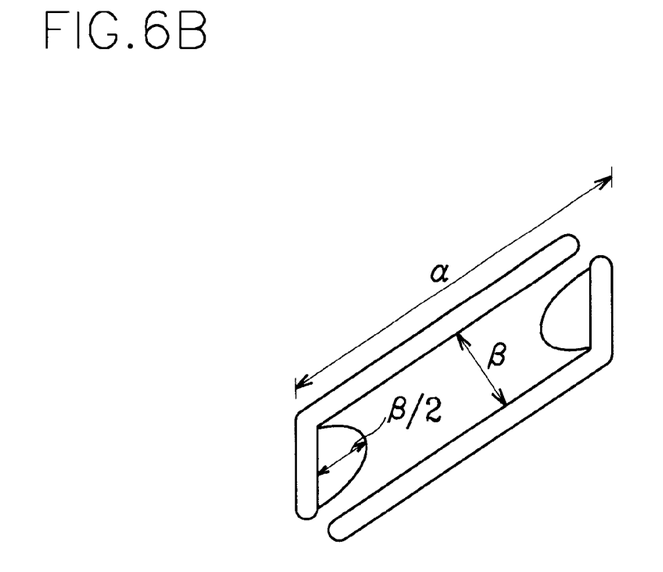

FIGS. 6A and 6B are drawings showing planar shapes of domains divided by domain formation means.

The means forming domains may be provided in a variety of shapes. The resulting shape of the domains, as shown in FIGS. 6A and 6B, is either rectangular or oval-shaped. With this structure, the liquid crystal molecules are not uniformly driven within the domains when a voltage is applied, but rather they experience a scattered alignment direction at edges where two domain formation elements meet. Accordingly, brightness and responsiveness are reduced, resulting in problems such as the generation of white afterimages.

If a length of a domain in a direction between two opposing domain formation elements is denoted as $\beta$ (a direction in line with liquid crystal directors), and a length of a domain in a direction uniform with a direction of the domain formation elements is denoted as $\alpha$ (a direction vertical to liquid crystal directors), a region of scattering liquid crystal directors is formed with a radius that is one-half the length of the short axis direction $\beta$. This region is formed substantially as a semicircle.

Figure 7:
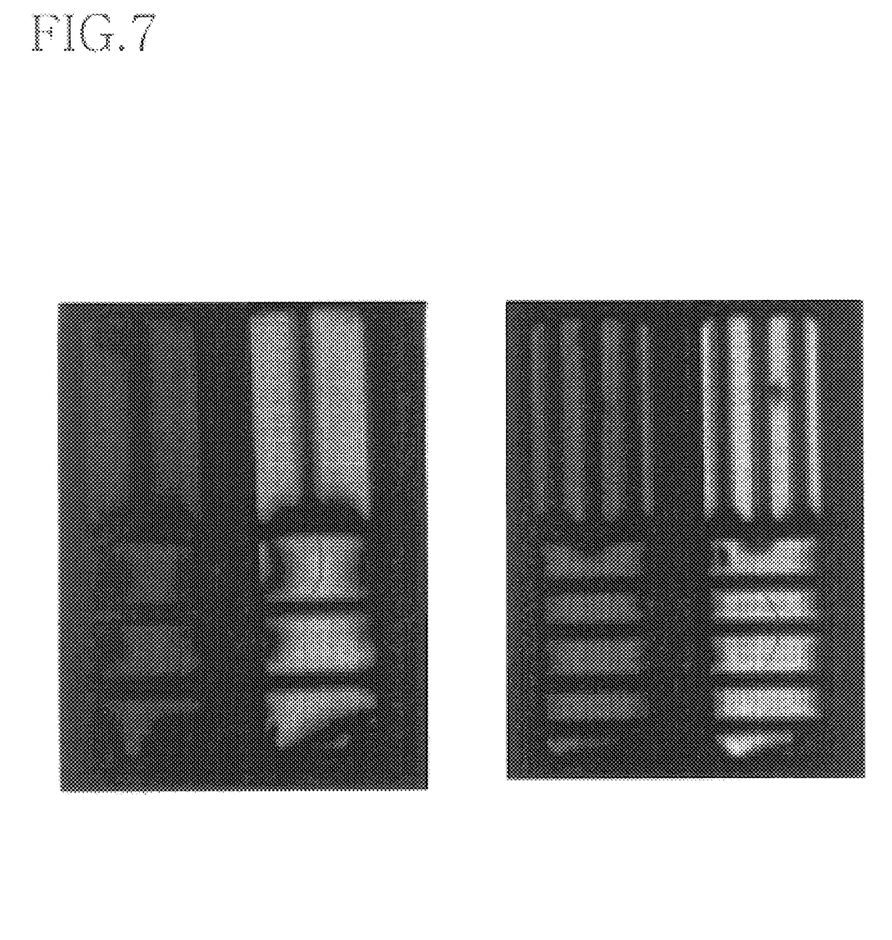
FIG. 7 shows microphotographs of a portion of a liquid crystal display used to illustrate differences in picture quality depending on domain size.

FIG. 7 shows microphotographs of a portion of a liquid crystal display used to illustrate differences in picture quality depending on domain size.

As shown in FIG. 7, dark portions are reduced as a distance of a short axis direction is minimized. Accordingly, in the vertically-aligned mode, the difference between the long axis direction $\alpha$ and the short axis direction $\beta$ must be made as great as possible to increase the effectiveness of the domains. That is, the following condition must be satisfied:

long axis direction $\alpha$>short axis direction $\beta$

A ratio of an area of unstable regions (where liquid crystal directors are scattered) to an entire area in the domains is as follows:

$$[\pi(\beta/2)^2]/(\alpha\beta)=\pi\beta/4\alpha$$

It is preferable that this ratio of areas is made as small as possible, and is at least 0.25. Accordingly, the ratio of $\beta$ to $\alpha$ must be 1 to 3.

Figure 8:
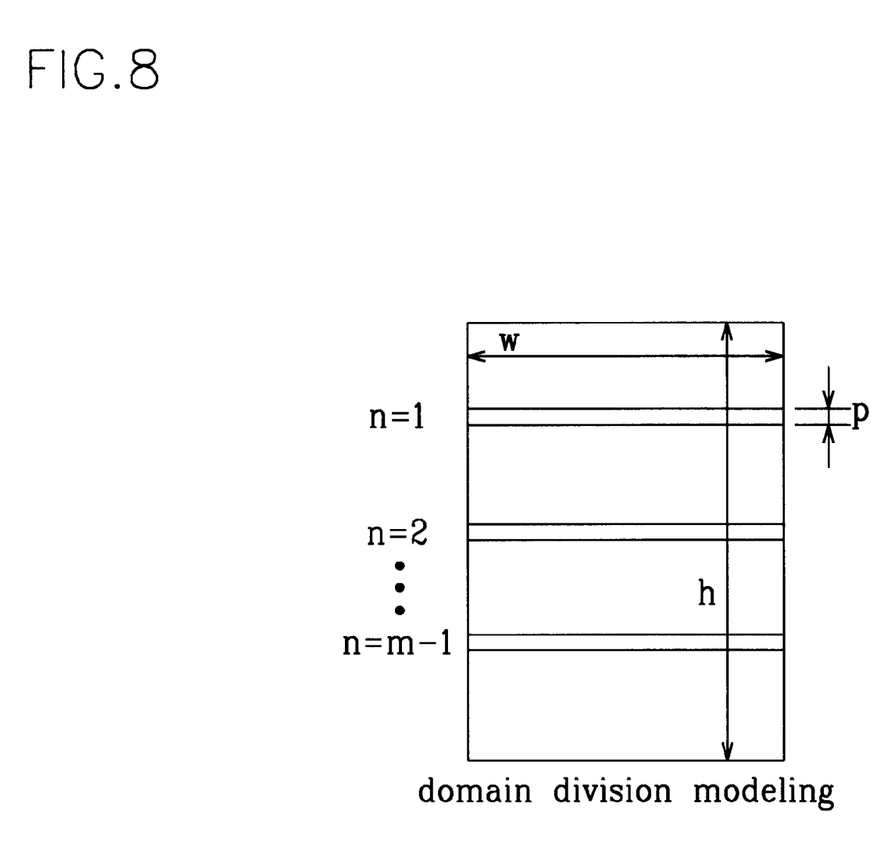
FIG. 8 is a drawing showing dimensions of a pixel electrode as variables to mathematically obtain an optimal number of domains.

FIG. 8 is a drawing showing dimensions of a pixel electrode as variables to mathematically obtain an optimal number of domains.

In FIG. 8, a pixel region with a width of "w" and a height of "h" is divided into an "m" number of domains. In this case, the most effective number of domains to obtain good brightness is to be determined.

An entire area is "wh", and an area that appears black in edge portions is identical to an m number of circles with a diameter h/m, $\pi(h/2m)^2$. An area of reduced brightness as a result of a width of a domain boundary p is $(m-1)wp$. Accordingly, an entire area A in which the liquid crystals are normally aligned is, $$A=wh-(\pi h^2)/4m-(m-1)wp$$

Here, the best brightness is realized by maximizing A.
The followings result if A is differentiated:

$$A'=(\pi h^2)/4m^2-wp$$

$$A''=-(\pi h^2)/2m^3<0$$

Since A" is less than zero, A has a maximum value where A'=0. The following steps are performed in solving for m when A'=0:

$$wp=(\pi h^2)/4m^2$$

$$m^2=(\pi h^2)/4wp$$

$$m=h/2(\pi/wp)^{1/2}$$

Accordingly, the best results are obtained when the number of domains m equals $h/2\ (\pi/wp)^{1/2}$. An example where a pixel region of 100 μm×300 μm is divided into long rectangular domains as shown in FIG. 8 will be described. At this time, h=3w. Further, since p (a width of a region that is dark as a result of the width of the domain formation means) is generally about 10 μm, p=w/10. Then, $$m=\tfrac{3}{2}\ (10\pi)^{1/2}\approx 8.4$$

That is, the ideal number of domains is approximately 8.

The value that most affects the value of m is p. If a width of the pattern is reduced such that the dark region becomes approximately 6 μm, $$m=\tfrac{3}{2}\ (16.7\pi)^{1/2}\approx 10.9$$

such that the ideal number of domains is increased to 11.

If only half of the pixel region is made into long and vertical rectangular domains, and the rest of the region is made into long and horizontal rectangular domains, the ideal number of domains is between 4 and 6, according to the width of the domain formation means.

In the above, the suitable range for the number of domains is, $$h/2(\pi/wp)^{1/2}-2 \leq m \leq h/2(\pi/wp)^{1/2}+2$$

The same principles as those described above apply in the case where the shape of the domains is oval-shaped as described in the fifth preferred embodiment.

In the vertically-aligned liquid crystal display of the present invention described above, the number of domains is determined such that the highest brightness and optimum picture quality are obtained.

Although preferred embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. A liquid crystal display, comprising:
   a first substrate and a second substrate provided opposing one another;
   a liquid crystal layer made of liquid crystal material injected between the first substrate and the second substrate;
   pixel electrodes and a common electrode formed on at least one of the substrates, the pixel electrodes and the common electrode generating an electric field that acts on the liquid crystal layer; and
   domain formation means for controlling a slanting direction of liquid crystal molecules within the liquid crystal layer,
   wherein m is an integer satisfying the following:

$$h/2(\pi/wp)^{1/2}-2 \leq m \leq h/2(\pi/wp)^{1/2}+2$$

where m is a number of domains formed by dividing the pixel electrodes by the domain formation means, w is a length of a first direction of the pixel electrodes, h is a length of a second direction of the pixel electrodes, the second direction being perpendicular to the first direction, and p is a width of a second direction of the domain formation means.

2. The liquid crystal display of claim 1, wherein the domain formation means are a first aperture pattern and a second aperture pattern formed respectively in the common electrode and the pixel electrodes.

3. The liquid crystal display of claim 2, wherein the first aperture pattern and the second aperture pattern are formed alternately.

4. The liquid crystal display of claim 1, wherein the domain formation means are a first protrusions and a second protrusion formed respectively on the first substrate and the second substrate.

5. The liquid crystal display of claim 4, wherein the first protrusions and the second protrusions are arranged alternately.

6. The liquid crystal display of claim 1, wherein the domain formation means are an aperture pattern formed in the pixel electrodes and a protrusion formed on the first substrate.

7. The liquid crystal display of claim 6, wherein apertures of the aperture pattern and the protrusion are arranged alternately.

8. The liquid crystal display of claim 1, wherein h=3w and p=w/10.

9. The liquid crystal display of claim 1, wherein if a length of a direction vertical to liquid crystal directors of the domains divided by the domain formation means is denoted by α, and a length of a direction parallel to the liquid crystal directors of the domains is denoted by β, β/α≦⅓.

10. A liquid crystal display, comprising:
    a first substrate and a second substrate provided opposing one another;
    a liquid crystal layer made of liquid crystal material injected between the first substrate and the second substrate;
    pixel electrodes and a common electrode formed on at least one of the substrates, the pixel electrodes and the common electrode generating an electric field that acts on the liquid crystal layer; and
    domain formation means for controlling a slanting direction of liquid crystal molecules within the liquid crystal layer,
    wherein the domain formation means includes first direction means and second direction means according to an alignment direction, and wherein the pixel electrodes are divided into a first region corresponding to a position of the first direction means and a second region corresponding to a position of the second direction means, and
    wherein m is an integer satisfying the following:

$$h/2(\pi/wp)^{1/2}-2 \leq m \leq h/2(\pi/wp)^{1/2}+2$$

where m is a number of domains formed by divisions into the first regions and second regions respectively by the first direction means and second direction means, w is a length of a first direction of the first regions and a length of a second direction of the second regions, h is a length of a second direction of the first regions and a first direction of the second regions, and p is a width of the second direction of the first direction means and a width of the first direction of the second direction means.

11. The liquid crystal display of claim 10, wherein the domain formation means are a first aperture pattern and a second aperture pattern formed respectively in the common electrode and the pixel electrodes.

12. The liquid crystal display of claim 11, wherein the first aperture pattern and the second aperture pattern are formed alternately.

13. The liquid crystal display of claim 10, wherein the domain formation means are a first protrusions and a second protrusion formed respectively on the first substrate and the second substrate.

14. The liquid crystal display of claim 13, wherein the first protrusions and the second protrusions are arranged alternately.

15. The liquid crystal display of claim 10, wherein the domain formation means are an aperture pattern formed in the pixel electrodes and a protrusion formed on the first substrate.

16. The liquid crystal display of claim 15, wherein apertures of the aperture pattern and the protrusion are arranged alternately.

17. The liquid crystal display of claim 10, wherein h=1.5w and p=w/10.

18. The liquid crystal display of claim 10, wherein if a length of a direction vertical to liquid crystal directors of the domains divided by the domain formation means is denoted by α, and a length of a direction parallel to the liquid crystal directors of the domains is denoted by β, β/α≦⅓.

* * * * *